US009688780B2

(12) United States Patent
Anderson, Jr. et al.

(10) Patent No.: US 9,688,780 B2
(45) Date of Patent: Jun. 27, 2017

(54) ALLYL ETHER SULFATE POLYMERIZABLE SURFACTANTS AND METHODS FOR USE

(71) Applicant: RHODIA OPERATIONS, Paris (FR)

(72) Inventors: Eugene J. Anderson, Jr., Marlton, NJ (US); Nemesio Martinez-Castro, Bristol, PA (US); Zhihua Zhang, Singapore (SG); Derek Pakenham, Hamilton, NJ (US)

(73) Assignee: Rhodia Operations, Paris (FR)

( * ) Notice: Subject to any disclaimer, the term of this patent is extended or adjusted under 35 U.S.C. 154(b) by 0 days.

(21) Appl. No.: 14/820,829

(22) Filed: Aug. 7, 2015

(65) Prior Publication Data

US 2016/0039951 A1 Feb. 11, 2016

Related U.S. Application Data

(60) Provisional application No. 62/034,903, filed on Aug. 8, 2014.

(51) Int. Cl.
| | | |
|---|---|---|
| *C08F 2/26* | (2006.01) | |
| *C08K 5/42* | (2006.01) | |
| *C08F 220/38* | (2006.01) | |
| *C08F 216/14* | (2006.01) | |

(52) U.S. Cl.
CPC .............. *C08F 2/26* (2013.01); *C08F 220/38* (2013.01); *C08F 2216/1475* (2013.01); *C08K 5/42* (2013.01)

(58) Field of Classification Search
CPC .. C08F 220/38; C08F 2/26; C08F 2216/1475; C08K 5/42
See application file for complete search history.

(56) References Cited

U.S. PATENT DOCUMENTS

| | | | | |
|---|---|---|---|---|
| 5,162,475 A | * | 11/1992 | Tang | C08F 290/062 526/287 |
| 5,928,783 A | * | 7/1999 | Phan | C08K 5/42 427/208.4 |
| 5,969,032 A | | 10/1999 | Phan et al. | |
| 7,169,846 B2 | * | 1/2007 | Chen | C08F 220/18 523/177 |
| 8,318,882 B2 | * | 11/2012 | Fechner | C08F 8/14 526/240 |
| 2003/0100670 A1 | * | 5/2003 | Chen | C08F 220/18 524/601 |
| 2004/0143058 A1 | * | 7/2004 | Guo | C08F 8/30 524/800 |
| 2004/0157958 A1 | | 8/2004 | Vincent et al. | |
| 2005/0205837 A1 | * | 9/2005 | Miwa | C09G 1/02 252/79.1 |
| 2007/0100068 A1 | * | 5/2007 | Chen | C08F 220/18 524/817 |
| 2007/0100069 A1 | * | 5/2007 | Chen | C08F 220/18 524/817 |

(Continued)

FOREIGN PATENT DOCUMENTS

| | | |
|---|---|---|
| JP | 9324005 A | 12/1997 |
| JP | 2013159741 A2 | 8/2013 |
| WO | 03/006517 A1 | 1/2003 |

*Primary Examiner* — Michael A Salvitti

(57) ABSTRACT

Disclosed are ethylenically unsaturated salts of allyl (poly) ether sulfates utilized as reactive surfactants (emulsifiers) during emulsion polymerization.

10 Claims, 1 Drawing Sheet

Emulsion Application Results

(56) References Cited

U.S. PATENT DOCUMENTS

| | | | | |
|---|---|---|---|---|
| 2007/0123637 A1* | 5/2007 | Pernecker | ............. | C08F 220/12 |
| | | | | 524/556 |
| 2014/0296401 A1* | 10/2014 | Watanabe | ................ | C09J 11/06 |
| | | | | 524/159 |
| 2015/0011675 A1* | 1/2015 | Fukaumi | .............. | C09D 133/00 |
| | | | | 523/135 |
| 2016/0039951 A1* | 2/2016 | Anderson, Jr. | ........... | C08F 2/26 |
| | | | | 524/850 |
| 2016/0117958 A1* | 4/2016 | LaChapell | ............. | C09J 7/0217 |
| | | | | 428/355 EN |

* cited by examiner

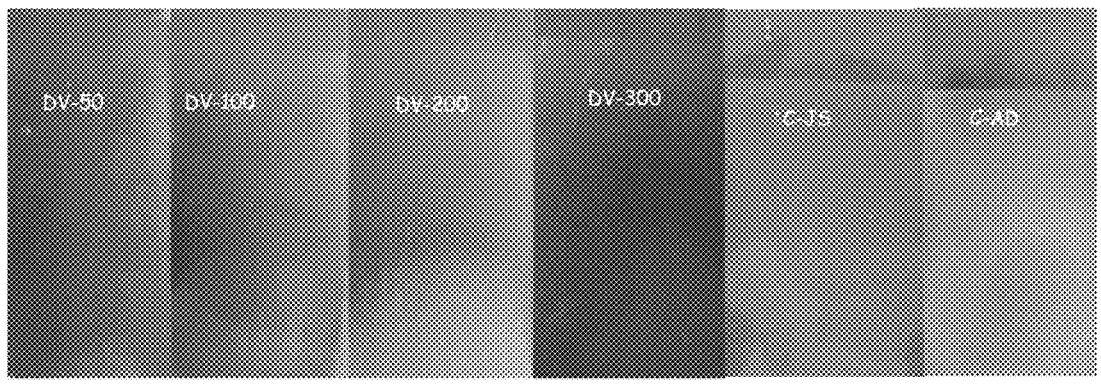
Emulsion Application Results

ALLYL ETHER SULFATE POLYMERIZABLE SURFACTANTS AND METHODS FOR USE

CROSS REFERENCE TO RELATED APPLICATIONS

This application claims the benefit of U.S. Provisional Patent Application No. 62/034,903, filed Aug. 8, 2014, incorporated herein by reference in its entirety

FIELD OF INVENTION

This invention relates to allyl ether sulfate polymerizable surfactants, alkyl polyoxyalkylene ether sulfate and/or alkyl polyoxyalkylene ether phosphate polymerizable surfactants, which are utilized in the preparation of polymers by emulsion polymerization.

BACKGROUND

Surfactants are utilized in a variety of applications for, e.g., dispersion, emulsification, wetting and foaming, across numerous industries such as coatings, adhesives, home care, personal care, construction, paper, inks and the like. Surfactants are often times contained in products such as paints and coating because they are necessary to stabilize the products or during manufacturing of the product. However, often times, the presence of surfactants in the end products negatively affect desirable properties in such end products. In paints, for example, the presence of excessive surfactants may contribute of increased water-sensitivity.

Emulsifiers are surfactants used in the preparation of polymers through a process called emulsion polymerization. Typically, such emulsifiers are understood to affect the mechanical stability and chemical stability, among others, of the resulting emulsions. Further, emulsifiers play a role in physical properties of the emulsions, such as viscosity, particle size, and the like. Emulsifiers also play a role in the physical properties of the films, such as weatherability, durability and adhesion.

The resulting latex is typically used in coating applications such as paints, inks, stains, etc. Once the latex-containing product has been applied to a surface as part of a protective or decorative coating, the surfactant is no longer needed or desired. The presence of the surfactant often degrades the moisture sensitivity of the coating. In addition, other coating properties can be negatively affected, such as adhesion to the substrate surface. It is typically understood that this negative effect is largely due to the mobility of the surfactant polymers. For example, locally high concentrations of surfactant molecules can form in the coating from the coalescence of surfactant-coated micelle spheres. When the coating is exposed to water, these unbound surfactant molecules can be extracted from the coating leaving thin spots or pathways to the substrate surface. This can result in a pinholing effect and attack of the substrate by water. Other undesired effects include blooming or blushing in a coating film, which occurs as a result of the film being put in contact with water, causing surfactant to migrate to the surface. As a result, the film can become hazy and lose its original sheen.

SUMMARY OF INVENTION

These problems are thought to be attributed to these surfactants still remaining as free form in the polymers. One method for lowering the contents of such free surfactants is to react such surfactants with polymers during polymerization or otherwise made it so such surfactants do not remain in free forms in the product or intermediary products, i.e., reactive surfactants or "polymerizable surfactants". It is understood that the term "reactive surfactant(s)" and "polymerizable surfactant(s)" is used interchangeably herein.

In one aspect, described herein are reactive or polymerizable surfactants of formula (I):

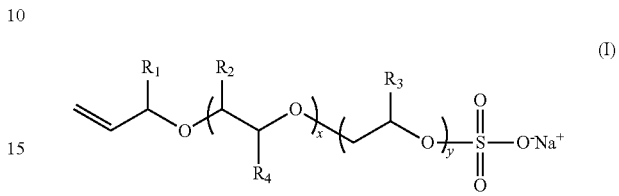

Wherein R1 is H or a C1-C10 alkyl group; R2 is H or a C1-C3 alkyl group; R3 is H or a C1-C3 alkyl group; R4 is H or a C1-C3 alkyl group; and wherein "x" is an integer from 0-100 and "y" is an integer from 0-100, provided that x+y is greater or equal to 1. In another embodiment, R1 is H or a C1-C50 alkyl group. In another embodiment, X+Y is greater or equal to 4. In other embodiments, R2 is H or a C1-C2 alkyl group; R3 is H or a C1-C2 alkyl group. In another embodiment, "x" is an integer from 0-20 and "y" is an integer from 0-20, provided that x+y is greater or equal to 1. In another embodiment, "x" is an integer from 0-40 and "y" is an integer from 0-40, provided that x+y is greater or equal to 1

In another aspect, described herein are reactive or polymerizable surfactants of formula (II):

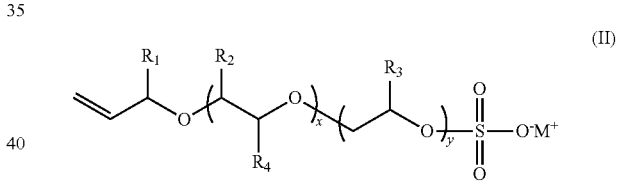

Wherein R1 is H or a C1-C10 alkyl group; wherein R2 is H or a C1-C3 alkyl group; wherein R3 is H or a C1-C3 alkyl group; R4 is H or a C1-C3 alkyl group; wherein "M+" is a cation, and wherein "x" is an integer from 0-100 and "y" is an integer from 0-100, provided that x+y is greater or equal to 1. In another embodiment, R1 is H or a C1-C50 alkyl group. In another embodiment, x+y is greater or equal to 4. In other embodiments, R2 is H or a C1-C2 alkyl group; R3 is H or a C1-C2 alkyl group. In another embodiment, "x" is an integer from 0-20 and "y" is an integer from 1-20, provided that x+y is greater or equal to 1. In another embodiment, M+ is, but is not limited to, H+, Na+, NH4+, K+ or Li+.

In another aspect, described herein are reactive or polymerizable surfactants of formula (III):

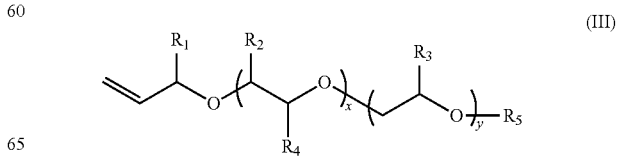

Wherein R1 is H or a C1-C10 alkyl group; wherein R2 is H or a C1-C3 alkyl group; wherein R3 is H or a C1-C3 alkyl group; R4 is H or a C1-C3 alkyl group; wherein R5 is a phosphate group or a sulfate group; and wherein "x" is an integer from 0-100 and "y" is an integer from 0-100, provided that x+y is greater or equal to 1. In another embodiment, R1 is H or a C1-C50 alkyl group. In another embodiment, x+y is greater or equal to 4. In other embodiments, R2 is H or a C1-C2 alkyl group; R3 is H or a C1-C2 alkyl group. In another embodiment, "x" is an integer from 0-20 and "y" is an integer from 1-20, provided that x+y is greater or equal to 1. In some embodiments, sulfate group or phosphate group includes each's corresponding salt forms, wherein the cation includes but not limited to Na+, NH4+, K+ or Li+

In another aspect, described herein are method of preparing a polymer (including but not limited to latex polymer emulsions and paints) utilizing the reactive surfactant of any of formula (I), formula (II) and/or formula (III) above as an emulsifier. In another aspect, described herein are method of preparing a polymer (including but not limited to latex polymer emulsions and paints) utilizing a polymerizable surfactant composition (or reactive surfactant composition) of any of formula (I), formula (II) and/or formula (III) above as an emulsifier in combination with at least one surfactant. In one embodiment, the surfactant is sodium alkylbenzene sulfonates, alkyl sulfosuccinates, alkyldiphenyloxide disulfonates, ethoxylated alkylphenol sulfates and phosphates, sulfates and phosphates of fatty alcohols. In another embodiment, the surfactant is a C10-C16 alcohol ethoxylate sulfate or any salt thereof.

BRIEF DESCRIPTION OF FIGURES

FIG. 1 shows a photograph of Emulsion Application Results of water sensitivity of polymers prepared with the reactive surfactants versus commercially available surfactants.

DETAILED DESCRIPTION OF INVENTION

In the summary of the invention and this detailed description, each numerical value should be read once as modified by the term "about" (unless already expressly so modified), and then read again as not so modified unless otherwise indicated in context.

As used herein, the term "alkyl" means a saturated hydrocarbon radical, which may be straight, branched or cyclic, such as, for example, methyl, ethyl, n-propyl, isopropyl, n-butyl, sec-butyl, t-butyl, pentyl, n-hexyl, cyclohexyl.

As used herein, the term "cycloalkyl" means a saturated hydrocarbon radical that includes one or more cyclic alkyl rings, such as, for example, cyclopentyl, cyclooctyl, and adamantanyl.

As used herein, the term "hydroxyalkyl" means an alkyl radical, more typically an alkyl radical, that is substituted with a hydroxyl groups, such as for example, hydroxymethyl, hydroxyethyl, hydroxypropyl, and hydroxydecyl.

As used herein, the term "alkylene" means a bivalent acyclic saturated hydrocarbon radical, including but not limited to methylene, polymethylene, and alkyl substituted polymethylene radicals, such as, for example, dimethylene, tetramethylene, and 2-methyltrimethylene.

As used herein, the term "alkenyl" means an unsaturated straight chain, branched chain, or cyclic hydrocarbon radical that contains one or more carbon-carbon double bonds, such as, for example, ethenyl, 1-propenyl, 2-propenyl.

As used herein, the term "aryl" means a monovalent unsaturated hydrocarbon radical containing one or more six-membered carbon rings in which the unsaturation may be represented by three conjugated double bonds, which may be substituted one or more of carbons of the ring with hydroxy, alkyl, alkenyl, halo, haloalkyl, or amino, such as, for example, phenoxy, phenyl, methylphenyl, dimethylphenyl, trimethylphenyl, chlorophenyl, trichloromethylphenyl, aminophenyl.

As used herein, the term "aralkyl" means an alkyl group substituted with one or more aryl groups, such as, for example, phenylmethyl, phenylethyl, triphenylmethyl.

As used herein, the terminology "(Cn-Cm)" in reference to an organic group, wherein n and m are each integers, indicates that the group may contain from n carbon atoms to m carbon atoms per group.

As used herein, the terminology "ethylenic unsaturation" means a terminal (that is, e.g., α, β) carbon-carbon double bond.

Emulsion polymerization is typically utilized in preparing aqueous latexes used in coatings such as paints and inks. The polymerization reaction generally occurs in micelles where the monomer droplet is stabilized by surfactants. The surfactant often times is an anionic surfactant of a mixture of anionic surfactant with nonionic surfactant, under conditions that promote polymerization. These surfactants, along with reaction conditions, determine properties of the polymer such as particle size. For example, anionic surfactants can provide shear stability to prevent loss due to coagulation. Nonionic surfactants can provide electrolyte or chemical stability to the growing latex particles. The type and structure of a surfactant can have a dramatic effect on emulsion properties such as particle size, particle size distribution and latex viscosity.

Like non-polymerizable surfactants, polymerizable surfactants are molecules that typically have a hydrophobic segment and an ionizable and/or polar group. The hydrophobic segment preferentially adsorbs onto the surface of the polymer particle (e.g., latex polymer particle) during and following particle polymerization. The hydrophilic group extends into the aqueous solution phase and provides a steric barrier or charge repulsion against particle agglomeration and coagulation.

However, unlike their non-polymerizable counterparts, polymerizable surfactants additionally contain a reactive group on the hydrophobic segment that is capable of covalently bonding to the latex surface. Usually this is a moiety such as terminal unsaturated carbon group, such as vinyl or an olefin group, which can participate in free-radical emulsion polymerization reactions. When used in an emulsion polymerization a large fraction of the surfactant molecules become irreversibly bound to the emulsion polymer chains and droplets. This can improve both the latex stability and reduce foaming, amongst other desirable properties.

The polymerizable surfactants as described herein are prepared from readily-available raw materials, and generally their preparation does not require any equipment or special handling. The polymerizable surfactants described herein may be prepared in a batch mode or a continuous mode. The polymerizable surfactants can be prepared in a variety of forms, including but not limited to, liquids, solutions, flakes, powders, solids, semi-solids, gels, ringing gels, or pastes. In one embodiment, the polymerizable, surfactants is prepared in a conventional solvent such as water, solvent (such as an alcohol), or a mixture thereof, to produce an aqueous solution of the polymerizable surfactant. The polymerizable surfactant as described herein also encompasses surfactants as salts in dry form, in one embodiment, and as aqueous solutions in another embodiment. Salts of the polymerizable surfactants may be isolated by drying a solution of the polymerizable surfactants. A solution of polymerizable surfactants can be prepared by dissolving the salt of the polymerizable surfactant in water, solvent, or a mixture thereof.

In one embodiment, the process for the production of the polymerizable surfactant of formula (I) or of formula (II) is a three-step process, generally, by first preparing allyl propoxylates by reacting allyl alcohol with propylene oxide. The allyl propoxylate was then alkoxylated, and thereafter reacted with an acid, which in one embodiment is as chloro sulfonic acid, to produce the polymerizable surfactant.

In the above-described production, a catalyst can also be used as needed. The catalyst can be any suitable catalyst, insofar as it is one commonly employed in ring-opening reactions of epoxy compounds. Suitable catalysts include but are not limited to tertiary amines, quaternary ammonium salts, boron trichloride or its ether complexes, aluminum chloride, barium oxide, sodium hydroxide, and potassium hydroxide.

In another embodiment, free radical forming compounds are utilized as catalysts in the emulsion polymerization process. Typically compounds used as catalysts are those that from free radicals via thermal decomposition, referred to in the art as "thermal initiators" or combinations of compounds that form free radicals via oxidation/reduction reactions. Such catalysts are combinations of an oxidizing agent and a reducing agent and are commonly referred to in the art as "redox initiators." Either thermal or redox catalysts may be used in the practice of the present invention.

Typical catalysts utilized as thermal initiators include persulfates, specifically potassium persulfate, sodium persulfate, ammonium persulfate and the like. Typical redox initiators include combinations of oxidizing agents or initiators such as peroxides, specifically benzoyl peroxide, t-butyl hydroperoxide, lauryl peroxide, hydrogen peroxide, 2,2'-diazobisiso-butyronitrile, and the like. Typical reducing agents include sodium bisulfite, sodium formaldehyde sulfoxylate, sodium hydrosulfite, and ascorbic and isoascorbic acid.

In one embodiment, the reaction temperature and pressure can be set at room temperature up to a temperature of 150° C. and 0.01 to 1 MPa, respectively, and if necessary, sodium hydroxide, potassium hydroxide, boron trifluoride or the like can be used as a catalyst. When introducing the anionic hydrophilic group represented by —SO3— M+, or a phosphate group as described herein, it is possible to use, for example, sulfamic acid, sulfuric acid, sulfuric anhydride, fuming sulfuric acid, chlorosulfonic acid or the like as an anionic hydrophilizing agent. No particular limitation is imposed on reaction conditions upon conducting the conversion into a sulfate, but in general, the reaction can be conducted at a temperature of from room temperature to 150° C. under environmental pressure or an elevated pressure up to about 0.5 MPa for approximately 1 to 10 hours.

When anionic hydrophilization is conducted, post-neutralization may be conducted with an alkali such as sodium hydroxide or potassium hydroxide, ammonia, an alkylamine, or an alkanolamine such as monoethanolamine or diethanolamine.

The polymerizable surfactants as described herein can be used for applications in which reactive surfactants containing one or more polyether groups have been used to date, specifically as emulsifiers for emulsion polymerization, dispersants for suspension polymerization, resin modifiers (for improvements in water repellency, adjustments in hydrophilicity, improvements in antistatic properties, improvements in anti-fogging properties, improvements in waterproofness, improvements in adhesion properties, improvements in dyeability, improvements in film-forming properties, improvements in weatherability, improvements in anti-blocking properties, etc.), fiber processing aids, non-dripping agents, soil resistance finishes, and the like.

When any one of the polymerizable surfactants as described herein is used as an emulsifier for emulsion polymerization, it can be used in any desired proportion within a proportion range with other emulsifiers (surfactants) for emulsion polymerization. In general, however, it can be used preferably in a proportion of from 0.1 to 20 wt. %, typically, in a proportion of from 0.2 to 10 wt. % based on the raw material monomer or monomers, and in other embodiment, in a proportion of from 0.2 to 5 wt. % based on the raw material monomer or monomers. Further, in another embodiment, surfactants aside from the polymerizable surfactant as described herein can be utilized during the emulsion polymerization process. Non-reactive surfactants that are commonly used in the emulsion polymerization process include both anionic and nonionic molecules. In one embodiment, the reactive surfactant as described herein can be utilized with one or more anionic surfactants. In one embodiment, the reactive surfactant as described herein can be utilized with one or more cationic surfactants. In one embodiment, the reactive surfactant as described herein can be utilized with one or more non-ionic surfactants. In one embodiment, the reactive surfactant as described herein can be utilized any combination of one or more anionic surfactants and one or more non-ionic surfactants.

Anionic surfactants used in connection with the reactive surfactants as described herein (in the emulsion polymerization process) are as follows: sodium alkylbenzene sulfonates, alkyl sulfosuccinates, alkyldiphenyloxide disulfonates, ethoxylated alkylphenol sulfates and phosphates, sulfates and phosphates of fatty alcohols, and the like, or any salt thereof. Non-ionic surfactants used in connection with the reactive surfactants as described herein (in the emulsion polymerization process) are as follows: alcohol ethoxylates, alkylphenol ethoxylates, and the like, or any salt thereof. In one embodiment. The anionic surfactant is a C10-16 alcohol ethoxylate sulfate, or any salt thereof.

Although no particular limitation is imposed on the monomer(s) to be subjected to emulsion polymerization, the polymerizable surfactant utilized for emulsion polymerization can be used preferably for acrylate emulsions, styrene emulsions, vinyl acetate emulsions, SBR (styrene/butadiene) emulsion, ABS (acrylonitrile/butadiene/styrene) emulsion, BR (butadiene) emulsion, IR (isoprene) emulsion, NBR (acrylonitrile/butadiene) emulsion, and the like.

Suitable monomers that may be polymerized under emulsion polymerization conditions as described herein include ethylenically unsaturated monomers, for example, vinyl monomers and acrylic monomers. Typical vinyl monomers suitable for use include, but are not limited to, vinyl esters such as vinyl acetate, vinyl benzoate, vinyl propionate; vinyl aromatic hydrocarbons such as styrene, methyl styrenes, other vinyl aromatics such as vinyl toluenes, vinyl napthalenes, divinyl benzene, and the like. Halogenated vinyl monomers such as vinyl chloride, vinylidene chloride, etc. may also be used.

Suitable acrylic monomers typically include compounds with acrylic functionality such as alkyl acrylates and methacrylates, acrylate acids and methacrylate acids as well as acrylamides and acrylonitrile. Typical acrylic monomers include, but are not limited to methyl acrylate and methyl methacrylate, ethyl, propyl, and butyl acrylate and methacrylate, benzyl acrylate and methacrylate, cyclohexyl acrylate and methacrylate, decyl and dodecyl acrylate and methacrylate, etc. Other acrylic monomers include hydroxy alkyl acrylates and methacrylates such as hydroxypropyl and hydroxyethyl acrylate and methacrylate, acrylic acids such as methacrylic and acrylic acid, and amino acrylates and methacrylates.

Other examples of (co)polymerizable monomers in the acrylate emulsions can include (meth)acrylic acid (acrylate) alone, (meth)acrylic acid (acrylate)/styrene, (meth)acrylic acid (acrylate)/vinyl acetate, (meth)acrylic acid (acrylate)/acrylonitrile, (meth)acrylic acid (acrylate)/butadiene, (meth)acrylic acid (acrylate)/vinylidene chloride, (meth)acrylic acid (acrylate)/allylamine, (meth)acrylic acid (acrylate)/vinylpyridine, (meth)acrylic acid (acrylate)/alkylolamides, (meth)acrylic acid (acrylate)/N,N-dimethylaminoethyl esters, and (meth)acrylic acid (acrylate)/N,N-diethylaminoethyl vinyl ether Other additives or components which are known to those skilled in the art may also be used in accordance with the present invention. These include chain transfer agents, which are used to control molecular weight, additives to adjust pH, and compounds utilized as protective colloids which provide additional stability to the latex particles.

In one embodiment, the polymerizable surfactant is of formula (I):

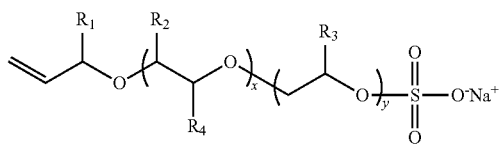

(I)

Wherein R1 is H or a C1-C10 alkyl group; R2 is H or a C1-C3 alkyl group; R3 is H or a C1-C3 alkyl group; R4 is H or a C1-C3 alkyl group; and wherein "x" is an integer from 0-100 and "y" is an integer from 0-100, provided that x+y is greater or equal to 1. In another embodiment, R1 is H or a C1-C50 alkyl group. In another embodiment, X+Y is greater or equal to 4. In other embodiments, R2 is H or a C1-C2 alkyl group; R3 is H or a C1-C2 alkyl group; R4 is H or a C1-C2 alkyl group. In another embodiment, "x" is an integer from 0-40 and "y" is an integer from 1-40, provided that x+y is greater or equal to 1. In another embodiment, "x" is an integer from 0-20 and "y" is an integer from 0-20, provided that x+y is greater or equal to 1.

In one embodiment, the polymerizable surfactant is of formula (II)

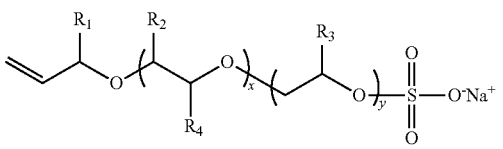

(II)

Wherein R1 is H or a C1-C10 alkyl group; R2 is H, R4 is a C1-C3 alkyl group; wherein "x" is an integer from 0-40 and wherein "y" is 0. In one further embodiment, "x" is an integer from 10-40. In another embodiment, "x" is an integer from 10-20. In one further embodiment, "x" is 10. In one further embodiment, "x" is 15. In another embodiment, "x" is 20.

In one embodiment, the polymerizable surfactant is of formula (Ib):

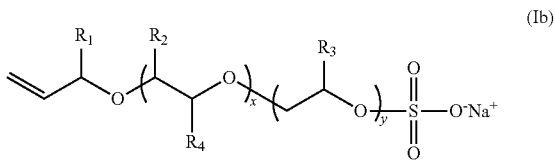

(Ib)

Wherein R1 is H or a C1-C10 alkyl group; R2 is H; R4 is a C1-C3 alkyl group; R3 is H; and wherein "x" is an integer from 1-40 and "y" is an integer from 1-10. In a further embodiment, "x" is an integer from 10-20 and "y" is an integer from 2-8.

In another aspect the present invention is a reactive or polymerizable surfactant is of formula (II):

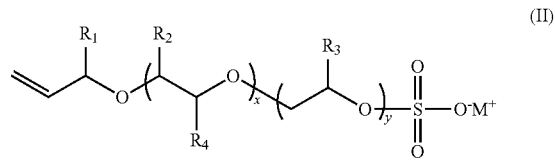

(II)

Wherein R1 is H or a C1-C10 alkyl group; wherein R2 is H or a C1-C3 alkyl group; wherein R3 is H or a C1-C3 alkyl group; R4 is H or a C1-C3 alkyl group; wherein "M+" is a cation, and wherein "x" is an integer from 0-40 and "y" is an integer from 0-40, provided that x+y is greater or equal to 1. In another embodiment, R1 is H or a C1-C50 alkyl group. In another embodiment, x+y is greater or equal to 4. In other embodiments, R2 is H or a C1-C2 alkyl group; R3 is H or a C1-C2 alkyl group. In another embodiment, "x" is an integer from 0-20 and "y" is an integer from 1-20, provided that x+y is greater or equal to 1. In another embodiment, M+ is, but is not limited to, H+, Na+, NH4+, K+ or Li+.

In another aspect, described herein are reactive or polymerizable surfactants of formula (III):

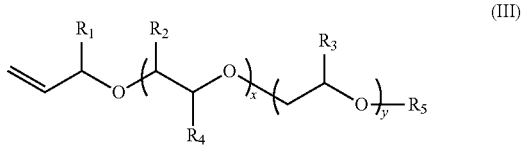

(III)

Wherein R1 is H or a C1-C10 alkyl group; wherein R2 is H or a C1-C3 alkyl group; wherein R3 is H or a C1-C3 alkyl group; R4 is H or a C1-C3 alkyl group; wherein R5 is a phosphate group or a sulfate group; and wherein "x" is an integer from 0-100 and "y" is an integer from 0-100, provided that x+y is greater or equal to 1. In another embodiment, R1 is H or a C1-C50 alkyl group. In another embodiment, x+y is greater or equal to 4. In other embodiments, R2 is H or a C1-C2 alkyl group; R3 is H or a C1-C2 alkyl group. In another embodiment, "x" is an integer from 0-20 and "y" is an integer from 1-20, provided that x+y is greater or equal to 1. In some embodiments, sulfate group or phosphate group includes their corresponding salt forms, wherein the cation includes but not limited to Na+, NH4+, K+ or Li+

In one embodiment, the term "phosphate group" means a phosphorus-containing radical according to formula (IIIa), (IIIb) and/or (IIIc):

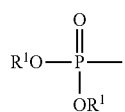

(IIIa)

wherein
each R1 is independently H or a C1-C10 alkyl group, as well as corresponding salt forms, such as:

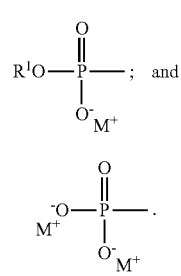

wherein M+ is a cation, typically a sodium or potassium cation. In another embodiment, each M+ is individually chosen from H+, Na+, NH4+, K+ or Li+.

In one embodiment, the reactive or polymerizable surfactant is of formula (II):

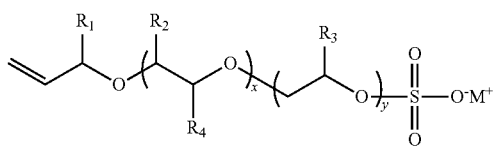

(II)

wherein R1 is H or a C1-C2 alkyl group; wherein R2 is a methyl group; wherein R3 is H; R4 is H (i.e., hydrogen); wherein "M+" is a cation, and wherein "x" is an integer from 0-20 and "y" is an integer from 0-10, provided that x+y is greater or equal to 1. In one embodiment, x+y is greater or equal to 4. In one embodiment, "x" is 10, 15 or 20. In another embodiment, "y" is 0, 4 or 8. In another embodiment, M+ is, but is not limited to, H+, Na+, NH4+, K+ or Li+. In a typical embodiment, M+ is Na+.

The use of reactive surfactants as described herein in emulsion polymerization imparts at least one of the following benefits to a latex and/or coating application: Medium reactivity, PME Stability, Good process Control, excellent application performance (e.g., water sensitivity)

Polymerizable surfactant surfactant compositions (or reactive surfactant compositions) can comprise any reactive surfactant according to formula (I), formula (II) and/or formula (III) above as an emulsifier in combination with at least one surfactant. In one embodiment, the surfactant is sodium alkylbenzene sulfonates, alkyl sulfosuccinates, alkyldiphenyloxide disulfonates, ethoxylated alkylphenol sulfates and phosphates, sulfates and phosphates of fatty alcohols. In another embodiment, the surfactant is an alkyl alcohol ethoxylate sulfate or any salt thereof. In another embodiment, the surfactant is C10-C16 alcohol ethoxylate sulfate or any salt thereof.

EXPERIMENTS

As shown in FIG. 1, the following test procedure was developed to evaluate water resistance in a latex synthesized using various processes and surfactants. Water uptake is measured as a function of film opacity with an opaque film being said to demonstrate poor water resistance. Testing was conducted with a 150 um applicator on Glass, and tested for 24 hours.

Equipment:
Glass panels
3 mil (150 μm) Drawdown Bar Applicator
Film Preparation:
Drawdown latex on glass panel to produce a thin film
Allow film to dry for 24 hours
Water Test Procedure:
Glass panel is placed in a water bath partially covering the bottom half of the panel
The panel is removed from the water bath after 24 hours, patted dry
Water uptake is measured by observing a change in opacity
A clear film is an example of good water resistance.
Polymerization recipe was as follows:
48.50 MMA/48.50 BA/2.00 MAA/1.00 AM
ME Seeded: 5.0%
Initiator: Ammonium Persulfate
Polymerization Temperature: 84° C.
Feed Time: 90 mins
The results as shown in table 1.

TABLE 1

Emulsion Application Results

|  | DV-50 | DV-100 | DV-200 | DV-300 | C-JS | C-AD |
|---|---|---|---|---|---|---|
| Solids | 27% | 29% | 39% | 35% | 8% | 25% |
| Particle Size/d · nm | 490.6 | 246.4 | 490 | 435.9 | 123 | 129 |
| PDI | 0.04 | 0.027 | 0.081 | 0.268 | 0.005 | 0.002 |
| Observation (Water Sensitivity) | Good. Very slight haziness | Good. Little or no haziness | OK. Slight haziness | Good. No haziness | Bad. Very Hazy (blue) | Bad. Very Hazy (blue) |

DV-50 is the reactive surfactant of formula (II) wherein "x"=0, y=9, R1 is H, R3 is a C1 group, and "M+" is "Na+".

DV-100 is a mixture of DV-50 and an anionic surfactant. DV-200 is the reactive surfactant of formula (II) wherein R1 is H, R2 is a C1 group, R4 is H, R3 is H, "x"=6, y=4, and "M+" is "Na+". DV-300 is the reactive surfactant of formula (II) wherein R1 is H, R2 is a C1 group, R4 is H, "x"=6, "y"=0, and "M+" is "Na+". C-AD is a comparative example of Adeka Reasoap SR-1025 (Adeka Corporation; Tokyo, Japan). C-JS is a comparative example of a "me too" product similar Eleminol JS-20 (Sanyo Company, Japan) which is a sodium alkyl allyl sulfosuccinate. It was observed that the latex prepared using the reactive surfactant compositions as described herein perform overall better than the comparative examples in terms of water sensitivity (i.e., the comparative examples C-JS and C-AD had much higher water sensitivity than the reactive surfactants described herein).

It is apparent that embodiments other than those expressly described herein come within the spirit and scope of the present claims. Accordingly, the present invention is not defined by the above description, but is to be accorded the full scope of the claims so as to embrace any and all equivalent compositions and methods.

What is claimed is:

1. A polymerizable surfactant composition comprising: a polymerizable surfactant of formula (II):

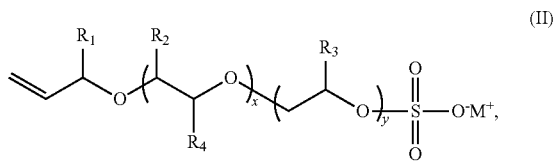

wherein $R_1$ is H or a $C_1$-$C_{10}$ alkyl group;
wherein $R_2$ is a $C_1$-$C_3$ alkyl group;
wherein $R_3$ is H;
wherein $R_4$ is H;
wherein "M+" is a cation,
wherein "x" is an integer from 10-40,
wherein "y" is an integer from 0-20; and
optionally, at least one second surfactant that is different from the polymerizable surfactant of formula (II).

2. The polymerizable surfactant composition of claim 1 wherein $M^+$ is $H^+$, $Na^+$, $NH_4^+$, $K^+$ or $Li^+$.

3. The polymerizable surfactant composition of claim 1 wherein $M^+$ is $Na^+$.

4. The polymerizable surfactant composition of claim 1 wherein "x" is an integer from 10-20, and wherein "y" is an integer from 2-8.

5. The polymerizable surfactant composition of claim 1 wherein the second surfactant is present and comprises sodium alkylbenzene, alkyl sulfosuccinates, alkyldiphenyloxide disulfonates, ethoxylated alkylphenol sulfates ethoxylated alkylphenol phosphates, fatty alcohol sulfates, fatty alcohols phosphates, alcohol ethoxylates or alkylphenol ethoxylates.

6. The polymerizable surfactant composition of claim 1 wherein the second surfactant is present and comprises a C10-C16 alcohol ethoxylate sulfate.

7. The polymerizable surfactant composition of claim 1 wherein "x" is an integer from 1-12.

8. The polymerizable surfactant composition of claim 1 wherein "y" is an integer from 1-5.

9. A process for preparing a coating comprising introducing the composition of claim 1 as an emulsifier during emulsion polymerization.

10. A polymerizable surfactant composition comprising: a polymerizable surfactant of formula (II):

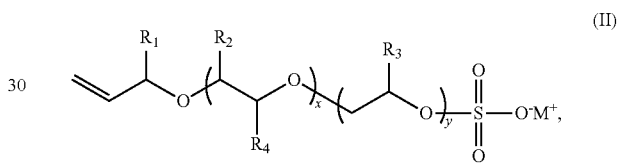

wherein $R_1$ is H;
wherein $R_2$ is a $C_1$-$C_3$ alkyl group;
wherein $R_3$ is H;
wherein $R_4$ is H;
wherein "M+" is a cation,
wherein "x" is an integer from 10-40,
wherein "y" is an integer from 0-20; and
at least one second surfactant that is different from the polymerizable surfactant of formula (II).

* * * * *